US011076458B2

(12) United States Patent
Tu et al.

(10) Patent No.: US 11,076,458 B2
(45) Date of Patent: Jul. 27, 2021

(54) STREET LAMP CONTROL DEVICE AND STREET LAMP CONTROL METHOD

(71) Applicants: LITE-ON ELECTRONICS (GUANGZHOU) LIMITED, Guangzhou (CN); Lite-On Technology Corporation, Taipei (TW)

(72) Inventors: Chin-Jui Tu, Taipei (TW); Kuei-Ling Chen, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/595,493

(22) Filed: Oct. 8, 2019

(65) Prior Publication Data
US 2021/0059024 A1 Feb. 25, 2021

(30) Foreign Application Priority Data
Aug. 19, 2019 (TW) .................................. 108129441

(51) Int. Cl.
*H05B 33/08* (2020.01)
*H05B 41/36* (2006.01)
*G05D 25/02* (2006.01)
*H05B 47/10* (2020.01)

(52) U.S. Cl.
CPC ............. *H05B 41/36* (2013.01); *G05D 25/02* (2013.01); *H05B 47/10* (2020.01)

(58) Field of Classification Search
CPC ......... G05D 25/02; H05B 41/36; H05B 47/10
See application file for complete search history.

(56) References Cited

U.S. PATENT DOCUMENTS

| 6,676,279 B1* | 1/2004 | Hubbell ................. F21S 8/088 362/293 |
| 8,475,002 B2* | 7/2013 | Maxik .................... H05B 45/20 362/276 |
| 9,286,804 B2* | 3/2016 | Fayfield ................. G08G 1/142 |
| 9,900,960 B1* | 2/2018 | Lin ......................... H05B 45/20 |
| 2015/0351185 A1* | 12/2015 | Montoya Correa ........................ F21V 23/0442 315/149 |
| 2017/0094738 A1* | 3/2017 | Garner ................... H05B 39/04 |
| 2018/0094782 A1* | 4/2018 | Chiang .................. E04H 12/08 |
| 2019/0081813 A1* | 3/2019 | Nistane ............... H04L 12/2825 |
| 2019/0325749 A1* | 10/2019 | Tu ............................ G08B 5/36 |

* cited by examiner

*Primary Examiner* — Kurtis R Bahr
(74) *Attorney, Agent, or Firm* — JCIPRNET

(57) ABSTRACT

A street lamp control device and a street lamp control method are provided. The street lamp control device includes a control node, a voltage dividing circuit, and a microprocessor. The control node is configured to provide an input voltage. The voltage dividing circuit is configured to receive the input voltage and perform a voltage dividing operation on the input voltage to generate an operating voltage. The microprocessor is configured to receive the operating voltage and generate a plurality of control signals according to the voltage value of the operating voltage. The control signals are respectively used to drive a plurality of light-emitting element groups of the street lamp, thereby adjusting at least one of a light shape and a color temperature of the street lamp.

19 Claims, 6 Drawing Sheets

|  | G1 | | | | G2 | | | | G3 | | | |
|---|---|---|---|---|---|---|---|---|---|---|---|---|
|  | CS1 | CS2 | CS3 | CS4 | CS1 | CS2 | CS3 | CS4 | CS1 | CS2 | CS3 | CS4 |
| 1V | 10 | 10 | 0 | 0 | 0 | 0 | 10 | 10 | 10 | 10 | 90 | 90 |
| 2V | 20 | 20 | 0 | 0 | 0 | 0 | 20 | 20 | 20 | 20 | 80 | 80 |
| 3V | 30 | 30 | 0 | 0 | 0 | 0 | 30 | 30 | 30 | 30 | 70 | 70 |
| 4V | 40 | 40 | 0 | 0 | 0 | 0 | 40 | 40 | 40 | 40 | 60 | 60 |
| 5V | 50 | 50 | 0 | 0 | 0 | 0 | 50 | 50 | 50 | 50 | 50 | 50 |
| 6V | 60 | 60 | 0 | 0 | 0 | 0 | 60 | 60 | 60 | 60 | 40 | 40 |
| 7V | 70 | 70 | 0 | 0 | 0 | 0 | 70 | 70 | 70 | 70 | 30 | 30 |
| 8V | 80 | 80 | 0 | 0 | 0 | 0 | 80 | 80 | 80 | 80 | 20 | 20 |
| 9V | 90 | 90 | 0 | 0 | 0 | 0 | 90 | 90 | 90 | 90 | 10 | 10 |
| 10V | 100 | 100 | 0 | 0 | 0 | 0 | 100 | 100 | 100 | 100 | 0 | 0 |

|  | G4 | | | | G5 | | | | G6 | | | |
|---|---|---|---|---|---|---|---|---|---|---|---|---|
|  | CS1 | CS2 | CS3 | CS4 | CS1 | CS2 | CS3 | CS4 | CS1 | CS2 | CS3 | CS4 |
| 1V | 0 | 10 | 90 | 90 | 0 | 10 | 90 | 0 | 0 | 10 | 0 | 90 |
| 2V | 0 | 20 | 80 | 80 | 0 | 20 | 80 | 0 | 0 | 20 | 0 | 80 |
| 3V | 0 | 30 | 70 | 70 | 0 | 30 | 70 | 0 | 0 | 30 | 0 | 70 |
| 4V | 0 | 40 | 60 | 60 | 0 | 40 | 60 | 0 | 0 | 40 | 0 | 60 |
| 5V | 0 | 50 | 50 | 50 | 0 | 50 | 50 | 0 | 0 | 50 | 0 | 50 |
| 6V | 0 | 60 | 40 | 40 | 0 | 60 | 40 | 0 | 0 | 60 | 0 | 40 |
| 7V | 0 | 70 | 30 | 30 | 0 | 70 | 30 | 0 | 0 | 70 | 0 | 30 |
| 8V | 0 | 80 | 20 | 20 | 0 | 80 | 20 | 0 | 0 | 80 | 0 | 20 |
| 9V | 0 | 90 | 10 | 10 | 0 | 90 | 10 | 0 | 0 | 90 | 0 | 10 |
| 10V | 0 | 100 | 0 | 0 | 0 | 100 | 0 | 0 | 0 | 100 | 0 | 0 |

FIG. 3

STREET LAMP CONTROL DEVICE AND STREET LAMP CONTROL METHOD

CROSS-REFERENCE TO RELATED APPLICATION

This application claims the priority benefit of Taiwan application serial no. 108129441, filed on Aug. 19, 2019. The entirety of the above-mentioned patent application is hereby incorporated by reference herein and made a part of this specification.

BACKGROUND OF THE INVENTION

1. Field of the Invention

The present invention relates to a control device and a control method, and more particularly to a street lamp control device and a street lamp control method.

2. Description of Related Art

Generally speaking, a control node on an intelligent street lamp is implemented by a control node according to NEMA standards. The control node is provided with seven pins in total. Among the seven pins of the control node, three pins are power transmission pins, while the other four control pins provide voltage for adjusting the brightness of the street lamp. Therefore, the conventional control node cannot adjust multiple light shapes or color temperatures of the street lamp.

SUMMARY OF THE INVENTION

The present invention provides a street lamp control device and a street lamp control method capable of adjusting at least one of a light shape and a color temperature of the light of a street lamp.

The street lamp control device of the present invention is configured to control a street lamp. The street lamp control device includes a control node, a voltage dividing circuit, and a microprocessor. The control node is configured to provide an input voltage. The voltage dividing circuit is coupled to the control node. The voltage dividing circuit is configured to receive the input voltage and perform voltage dividing operation on the input voltage to generate an operating voltage. The microprocessor is coupled to the voltage dividing circuit. The microprocessor is configured to receive the operating voltage and generate a plurality of control signals corresponding to the input voltage according to the voltage value of the operating voltage. The control signals are respectively used to drive a plurality of light-emitting element groups of the street lamp, thereby adjusting at least one of the light shape and the color temperature of the light of the street lamp. Light shapes and color temperatures generated by the light-emitting element groups are not completely the same.

The street lamp control method of the present invention is used to control a street lamp. The street lamp control method includes: receiving an input voltage via a control node, and performing voltage dividing operation on the input voltage to generate an operating voltage; generating a plurality of control signals corresponding to the input voltage according to the voltage value of the operating voltage; and respectively driving a plurality of light-emitting element groups of the street lamp according to the control signals, thereby adjusting at least one of the light shape and the color temperature of the light of the street lamp. The light shapes and the color temperatures generated by the light-emitting element groups are not completely the same.

Based on the above, according to the present invention, an input voltage is received via a control node; an operating voltage is generated according to the input voltage; a plurality of control signals are generated according to the voltage value of the operating voltage; and a plurality of light-emitting element groups of the street lamp are driven according to the control signals. As the control signals can be respectively used to drive the light-emitting element groups of the street lamp, the street lamp control device and the street lamp control method of the present invention can adjust at least one of the brightness, the light shape and the color temperature of the light of the street lamp.

In order to make the aforementioned and other objectives and advantages of the present invention comprehensible, embodiments accompanied with figures are described in detail below.

BRIEF DESCRIPTION OF THE DRAWINGS

FIG. 3 is an illustrative schematic diagram of a lookup table according to an embodiment of the present invention.

DESCRIPTION OF THE EMBODIMENTS

Figure 1:
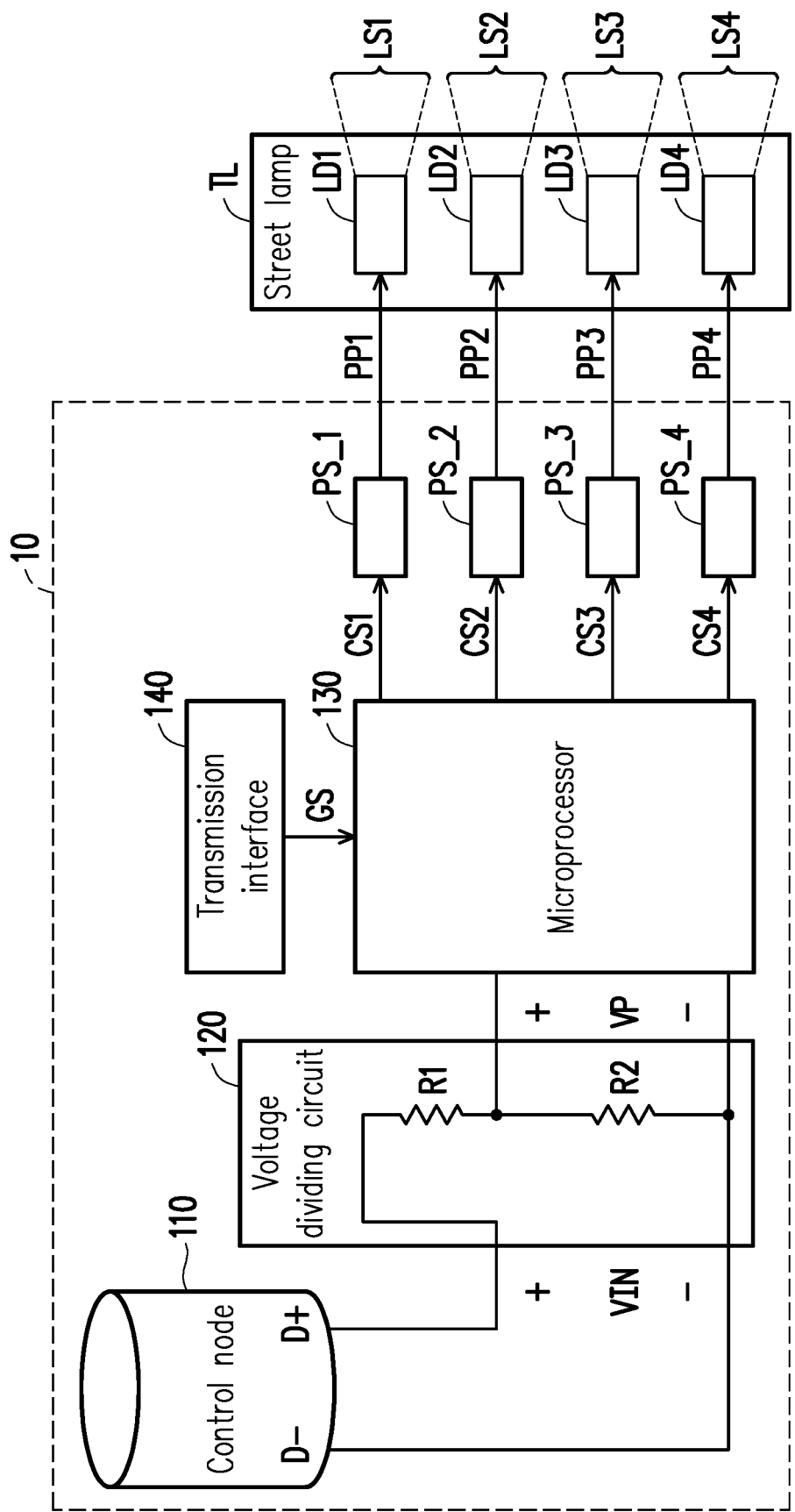
FIG. 1 is a schematic diagram of a street lamp control device and a street lamp according to an embodiment of the present invention.

Refer to FIG. 1; FIG. 1 is a schematic diagram of a street lamp control device and a street lamp according to an embodiment of the present invention. In the present embodiment, the street lamp control device 10 is configured to control the street lamp TL. The street lamp TL of the present embodiment includes light-emitting element groups LD1-LD4. The light-emitting element groups LD1-LD4 are respectively provided with at least one light-emitting element. The light-emitting element may be a light-emitting diode (LED). In terms of the design of the light-emitting element groups LD1-LD4, the light-emitting element group LD1 generates a light shape LS1; the light-emitting element group LD2 generates a light shape LS2; the light-emitting element group LD3 generates a light shape LS3; the light-emitting element group LD4 generates a light shape LS4; and the light shapes LS1-LS4 and color temperatures generated by the light-emitting element groups LD1-LD4 are not completely the same. For example, among the light-emitting element groups LD1-LD4, the light shape generated by the light-emitting element group LD1 is at least different from the light shape generated by the light-emitting element group LD2. For another example, the color temperature generated by the light-emitting element group LD1 is at least different from the color temperature generated by the light-emitting element group LD2. For still another example, the light shape and the color temperature generated by the light-emitting element group LD1 are different from the light shape and the color temperature generated by the light-emitting element group LD2.

In the present embodiment, the street lamp control device 10 includes a control node 110, a voltage dividing circuit 120, and a microprocessor 130. The control node 110 provides an input voltage VIN. For example, the control node 110 may be a control node according to NEMA standards. The control node 110 of the present embodiment may provide the input voltage VIN via a control pin D+ and provide a reference low voltage (such as grounding) via a control pin D−.

In the present embodiment, the voltage dividing circuit 120 is coupled to the control node 110. The voltage dividing circuit 120 receives the input voltage VIN provided by the control node 110, and performs voltage dividing operation on the input voltage VIN to generate an operating voltage VP. For example, the voltage value range of the input voltage VIN is 0 V to 10 V. The voltage dividing circuit 120 performs voltage dividing operation on the input voltage VIN to generate an operating voltage VP in a voltage value range of 0 V to 3.3 V. In the present embodiment, the voltage dividing circuit 120 is provided with voltage dividing resistors R1 and R2. The first end of the voltage dividing resistor R1 is coupled to the control pin D+. The first end of the voltage dividing resistor R1 is configured to receive the input voltage VIN. The first end of the voltage dividing resistor R2 is coupled to the second end of the voltage dividing resistor R1 and the microprocessor 130. The second end of the voltage dividing resistor R2 is coupled to the control pin D−. The first end of the voltage dividing resistor R2 is configured to serve as the output end of the voltage dividing circuit 120, thereby supplying the operating voltage VP to the microprocessor 130. Therefore, the voltage value of the input voltage VIN maintains a certain proportional relation with the voltage value of the operating voltage VP, and taking the situation in which the voltage value range of the input voltage VIN is 0 V to 10 V as an example, the resistance value of the voltage dividing resistor R1 may be designed to be two times the resistance value of the voltage dividing resistor R2 or equal to the resistance value of the voltage dividing resistor R2. The present invention is not limited by the number and resistance values of the voltage dividing resistors.

In the present embodiment, the microprocessor 130 is coupled to the voltage dividing circuit 120. The microprocessor 130 is configured to receive the operating voltage VP and generate control signals CS1-CS4 according to the voltage value of the operating voltage VP. The control signals CS1-CS4 correspond to the input voltage VIN. Therefore, the input voltage VIN provided by the control node 110 is not a driving voltage for driving the light-emitting elements to emit light but a basis for the generation of the control signals CS1-CS4. The microprocessor 130 of the present embodiment may include a central processing unit (CPU) with a data processing and operating function, other programmable general-purpose or special-purpose microprocessors, digital signal processors (DSPs), programmable controllers, application specific integrated circuits (ASICs) and programmable logic devices (PLDs) or other similar processing devices or a combination of these devices.

In the present embodiment, the control signals CS1-CS4 provided by the microprocessor 130 are respectively used to drive the light-emitting element groups LD1-LD4, thereby adjusting at least one of the brightness, the light shape and the color temperature of the street lamp TL. For example, the control signal CS1 is a control signal for driving the light-emitting element group LD1. The control signal CS2 is a control signal for driving the light-emitting element group LD2, and the rest may be deduced by analogy. For the convenience of description, in the present embodiment, the number of the control signals is four, and the number of the light-emitting element groups is four. In some embodiments, the number of the control signals may be different from the number of the light-emitting element groups. In the present invention, the number of the control signals and the number of the light-emitting element groups may be respectively multiple, and are not limited by the present embodiment.

Further, the street lamp control device 10 further includes power supply units PS1-PS4. The power supply units PS1-PS4 are respectively coupled to the microprocessor 130. The power supply units PS1-PS4 provide operating powers PP1-PP4 for driving the light-emitting element groups LD1-LD4 according to the control signals CS1-CS4. For example, the power supply unit PS_1 receives the control signal CS1, and provides the operating power PP1 for driving the light-emitting element group LD1 according to the control signal CS1. The power supply unit PS_2 receives the control signal CS2, and provides the operating power PP2 for driving the light-emitting element group LD2 according to the control signal CS2, and the rest may be deduced by analogy. In the present invention, the number of the power supply units may be multiple, and is not limited by the present embodiment.

It is worth mentioning here that the street lamp control device 10 can drive the light-emitting element groups LD1-LD4 of the street lamp TL with the control signals CS1-CS4. Thus, the street lamp TL can respond to the input voltage VIN of the street lamp control device 10 to adjust at least one of the brightness, the light shape and the color temperature of light.

Figure 2:
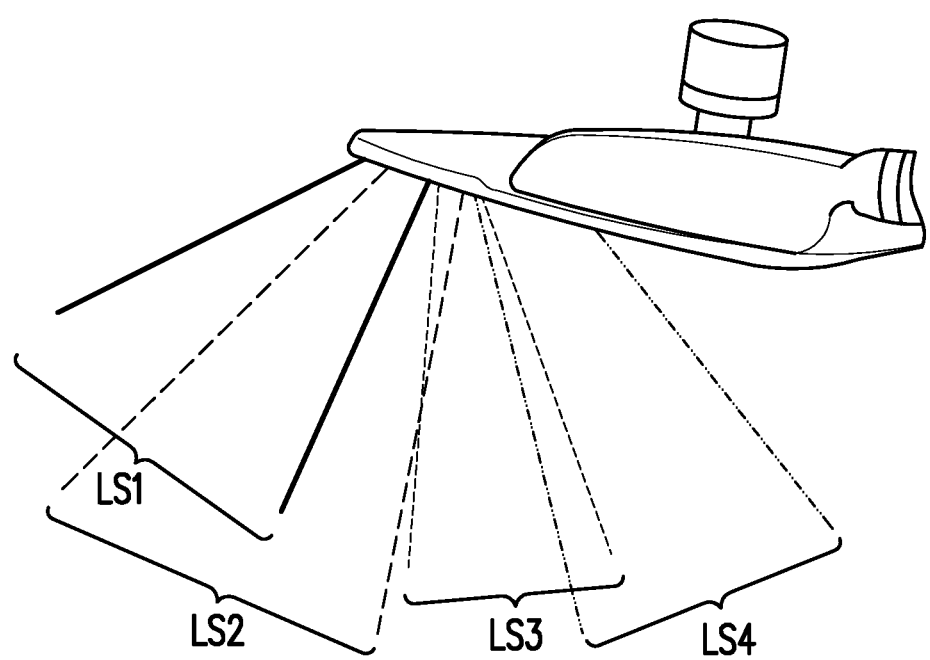
FIG. 2 is a schematic diagram of light-emitting element groups according to an embodiment of the present invention.

The design of the light-emitting element groups of the street lamp will be further described. Refer to both FIG. 1 and FIG. 2; FIG. 2 is a schematic diagram of light-emitting element groups according to an embodiment of the present invention. In the present embodiment, the light-emitting element group LD1 generates a light shape LS1; the light-emitting element group LD2 generates a light shape LS2; the light-emitting element group LD3 generates a light shape LS3; and the light-emitting element group LD4 generates a light shape LS4. For example, the range of the light shape LS2 is designed as a range which is adjacent to and partially overlaps the light shape LS1. The range of the light shape LS3 is designed as a range which is adjacent to and partially overlaps the light shape LS2. The range of the light shape LS4 is designed as a range which is adjacent to and partially overlaps the light shape LS3. In the present embodiment, when the light-emitting element groups LD1-LD4 are driven, the light of the street lamp TL can have the widest light shape, i.e. the maximum illumination range of the light shapes LS1-LS4. When the requirement for the illumination range is not high, the street lamp control device 10 can switch off the light-emitting element groups LD1 and LD4 or decrease the brightness of the light-emitting element groups LD1 and LD4, so that electricity consumed by the light-emitting element groups LD1 and LD4 can be saved. For another example, when illumination for sidewalks and lanes needs to be enhanced, the street lamp control device 10 can increase the brightness of the light-emitting element groups LD1 and LD3. Thus, under the control of the street lamp control device 10, the street lamp TL can provide light with different light shapes according to actual use requirement.

In addition, the color temperatures generated by the light-emitting element groups LD1-LD4 are not completely the same. For example, the color temperatures generated by the light-emitting element groups LD1 and LD2 are 2700 K, and the color temperatures generated by the light-emitting element groups LD3 and LD4 are 5000 K. Thus, under the control of the street lamp control device 10, the street lamp TL can also provide light with different color temperatures according to actual use requirement.

Return to FIG. 1; in the present embodiment, the microprocessor 130 can convert the operating voltage VP to generate an operating digital code value. That is, the microprocessor 130 can convert the operating voltage VP in the form of an analog signal into an operating digital code value in the form of a digital signal. Refer to both FIG. 1 and Table 1; Table 1 is an example comparison table of ranges of the operating digital code value, the input voltage VIN and the operating voltage VP.

TABLE 1

| Voltage value of input voltage VIN | Voltage value of operating voltage VP | Range of operating digital code value |
| --- | --- | --- |
| 1 V | 0.33 V | 350-749 |
| 2 V | 0.66 V | 750-1149 |
| 3 V | 1 V | 1150-1549 |
| 4 V | 1.33 V | 1550-1949 |
| 5 V | 1.66 V | 1950-2349 |
| 6 V | 2 V | 2350-2749 |
| 7 V | 2.33 V | 2750-3149 |
| 8 V | 2.66 V | 3150-3549 |
| 9 V | 3 V | 3550-3949 |
| 10 V | 3.33 V | 3950-4090 |

For example, in Table 1, the operating digital code value has twelve digits (the present invention is not limited thereto). When the voltage value of the operating voltage VP is equal to about 0.33V, the microprocessor 130 provides an operating digital code value (for example, 360) according to 0.33V. The microprocessor 130 can determine whether the voltage value of the operating voltage VP is valid or not according to a digital code value interval in which the operating digital code value (for example, 360) falls. If the operating digital code value (for example, 360) is within one of a plurality of default digital code value intervals, the microprocessor 130 determines that the voltage value of the operating voltage VP is valid. In addition, the microprocessor 130 can also determine according to the aforementioned valid operating digital code value that the voltage value of the input voltage VIN corresponding to the operating digital code value within one default digital code value interval is 1V. Therefore, the microprocessor 130 can generate the control signals CS1-CS4 corresponding to the voltage value of the input voltage VIN equal to 1V.

For another example, when the microprocessor 130 provides an operating digital code value (for example, 210) according to the voltage value of the operating voltage VP, the microprocessor 130 can determine that the voltage value of the operating voltage is invalid. Therefore, the microprocessor 130 does not generate the control signals CS1-CS4. Thus, the validity of the voltage value of the operating voltage VP and the validity of the voltage value of the input voltage VIN can be ensured. The present invention can adjust the relation among the ranges of the digital code value, the input voltage VIN and the operating voltage VP according to requirement. The ranges of all digital code values of the present invention may be consistent or partially inconsistent, and are not limited by the present embodiment.

In the present embodiment, the street lamp control device 10 can further include a transmission interface 140. The transmission interface 140 is coupled to the microprocessor 130. The transmission interface 140 receives a group selection signal GS. When receiving the group selection signal GS, the microprocessor 130 can generate the control signals CS1-CS4 according to the group selection signal GS and the operating voltage VP. In the present embodiment, when receiving the group selection signal GS, the transmission interface 140 can provide an interrupt command. Therefore, the microprocessor 130 can receive the group selection signal GS and the interrupt command and generate the control signals CS1-CS4 corresponding to the group selection signal GS according to the interrupt command. The transmission interface 140 may be a wireless communication interface or a wired communication interface which is well-known by those of ordinary skill in the art. In the present embodiment, the microprocessor 130 and the transmission interface 140 may be arranged on the same circuit board. In some embodiments, the voltage dividing circuit 120, the microprocessor 130 and the transmission interface 140 may be arranged on the same circuit board.

In the present embodiment, the street lamp control device 10 can further include a storage device (not shown). The storage device is coupled to the microprocessor 130. The storage device stores a lookup table. When receiving at least one of the group selection signal GS and the operating voltage VP, the microprocessor 130 can obtain the control signals CS1-CS4 corresponding to at least one of the group selection signal GS and the operating voltage VP based on the lookup table.

Further, refer to both FIG. 1 and FIG. 3; FIG. 3 is an illustrative schematic diagram of a lookup table according to an embodiment of the present invention. In the present embodiment, the lookup table 300 can be divided into six groups G1-G6. In the groups G1-G6, each row represents control signals CS1-CS4 corresponding to the voltage value of the input voltage VIN. "100" recorded in the lookup table 300 represents control signals for supplying powers with full power to the light-emitting element groups. "90" recorded in the lookup table 300 represents control signals for supplying powers with 90% of full power, and the rest may be deduced by analogy. Therefore, the greater the numbers recorded in the lookup table 300 are, the higher the supplied power is. The contents of the lookup table 300 can be adjusted according to use requirement. The number of the groups of the present invention and the contents of the lookup table 300 are not limited by the present embodiment.

In the present embodiment, when the microprocessor 130 receives the group selection signal GS and the operating voltage VP is changed, the microprocessor 130 can obtain the control signals CS1-CS4 corresponding to the group selection signal GS and the input voltage VIN in the lookup table 300. For example, when the microprocessor 130 receives the group selection signal GS for indicating the group G1 and the operating voltage VP is changed into 5V, the microprocessor 130 obtains the control signals CS1-CS4 (for example, box 310) corresponding to the operating voltage VP equal to 5V in the group G1. When the microprocessor 130 receives the operating voltage VP but does not receive the group selection signal GS, the microprocessor 130 does not change the group and obtains the control signals CS1-CS4 corresponding to the input voltage VIN according to the operating voltage VP. In the aforementioned example, when the operating voltage VP received by the microprocessor 130 is 8V and the group selection signal GS is not received, the microprocessor 130 does not change the group (kept at the group G1) and obtains the control signals CS1-CS4 corresponding to the operating voltage VP equal to 8V in the group G1. (For example, changed from box 310 to box 320). When the microprocessor 130 receives the group selection signal GS and the operating voltage VP is not changed, the microprocessor 130 can select a selected group indicated by the group selection signal GS from the same row in the lookup table 300 to obtain the control signals CS1-CS4 corresponding to the group selection signal GS and the input voltage VIN. In the aforementioned example, when the microprocessor 130 receives the group selection signal GS for indicating the group G3 and the operating voltage VP is not changed (kept at 8V), the microprocessor 130 obtains the control signals CS1-CS4 (for example, changed from box 320 to box 330) corresponding to the operating voltage VP equal to 8V in the group G3.

In addition, when the microprocessor 130 does not receive the group selection signal GS and the operating voltage VP is not changed, the control signals CS1-CS4 are not changed.

Figure 4:
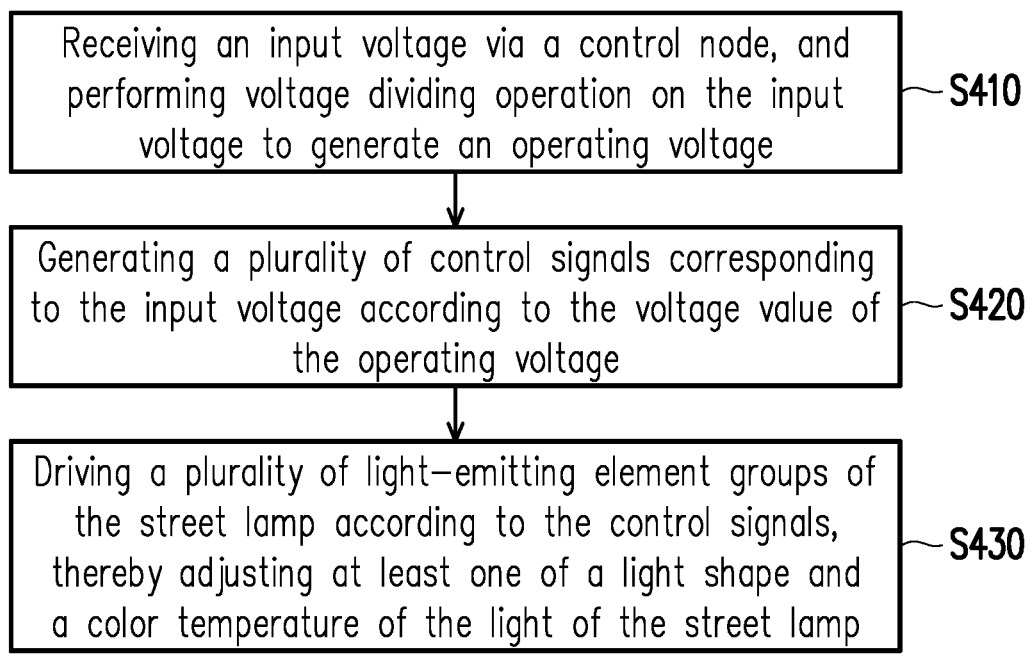
FIG. 4 is a flow chart of a street lamp control method according to an embodiment of the present invention.

Refer to both FIG. 1 and FIG. 4; FIG. 4 is a flow chart of a street lamp control method according to an embodiment of the present invention. In the present embodiment, the street lamp control method 400 is applicable to the street lamp control device 10. In step S410, the street lamp control device 10 receives an input voltage VIN via the control node 110, and performs voltage dividing operation on the input voltage VIN to generate an operating voltage VP. In step S420, the street lamp control device 10 generates control signals CS1-CS4 corresponding to the input voltage VIN according to the voltage value of the operating voltage VP. In step S430, the street lamp control device 10 drives the light-emitting element groups LD1-LD4 of the street lamp TL according to the control signals CS1-CS4, thereby adjusting at least one of the brightness, the light shape and the color temperature of the light of the street lamp. For steps S410-S430 of the present embodiment, enough teaching can be obtained at least from the embodiment in FIG. 1, and therefore is not repeated herein.

Figure 5:
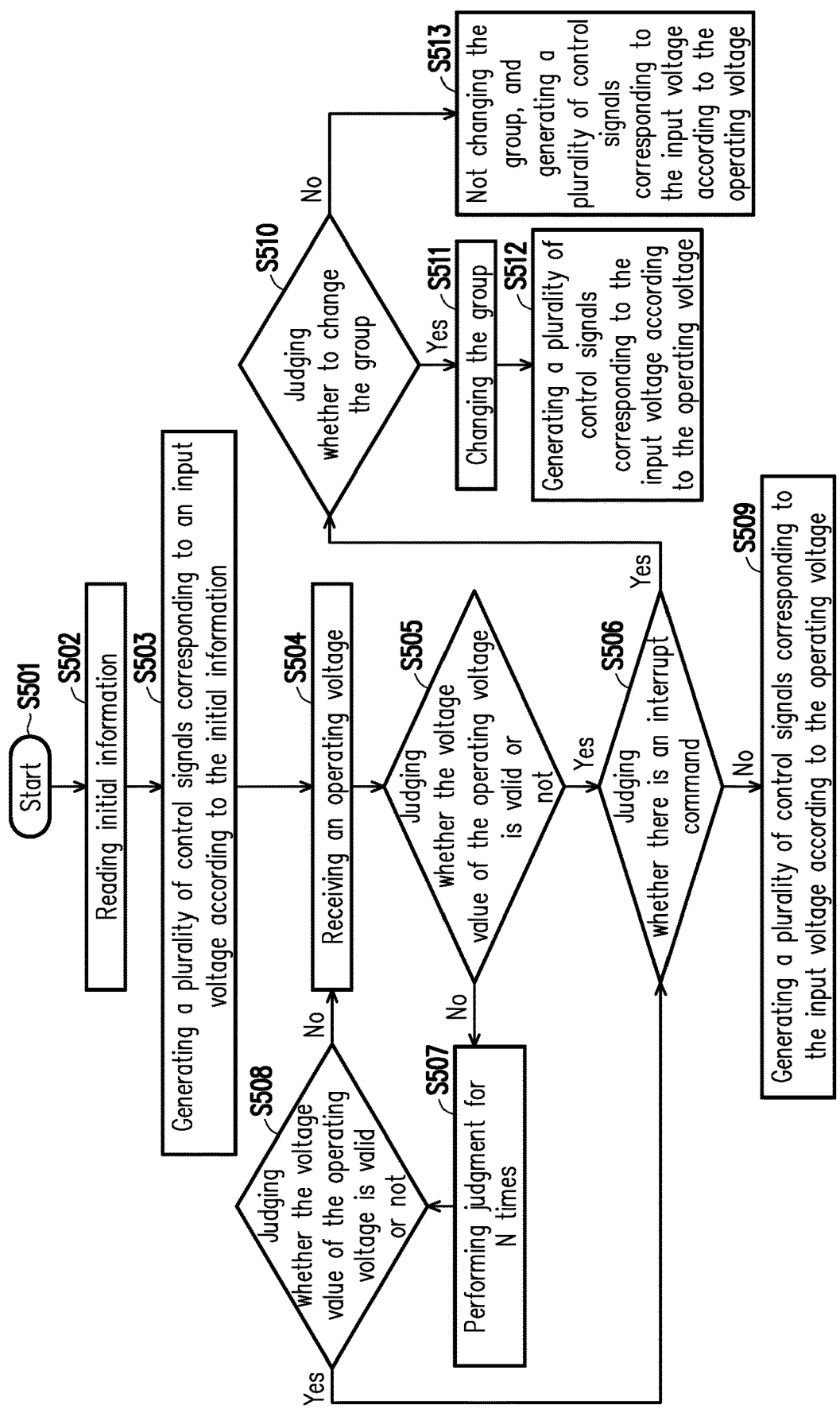
FIG. 5 is an operating flow chart of a microprocessor according to an embodiment of the present invention.

Refer to both FIG. 1 and FIG. 5; FIG. 5 is an operating flow chart of a microprocessor according to an embodiment of the present invention. The steps in FIG. 5 are executed by the microprocessor 130. In the present embodiment, when the street lamp control device 10 is started in step S501, the microprocessor 130 can read initial information in step S502. The initial information may be information associated with the operating voltage VP received by the street lamp control device 10 before the street lamp control device 10 is switched off, or default information preset before the street lamp control device 10 leaves the factory. For example, the aforementioned initial information is an initial digital code value associated with the operating voltage VP. The initial digital code value is an operating digital code value received before the street lamp control device 10 is switched off, or a operating digital code value preset before the street lamp control device 10 leaves the factory. The microprocessor 130 can generate the control signals CS1-CS4 corresponding to the input voltage VIN according to the initial information in step S503.

The microprocessor 130 receives the operating voltage VP in step S504, and determines whether the voltage value of the operating voltage VP is valid or not in step S505. The microprocessor 130 can convert the operating voltage VP in the form of an analog signal into an operating digital code value in the form of a digital signal, and determines whether the voltage value of the operating voltage VP is valid or not according to a digital code value interval in which the operating digital code value falls. With regard to an example of the determination method of step S505, enough teaching can be obtained from the illustration of FIG. 1 and Table 1, and therefore is not repeated herein. If the microprocessor 130 determines that the voltage value of the operating voltage VP is valid, it proceeds to step S506. Otherwise, if the microprocessor 130 determines that the voltage value of the operating voltage VP is invalid, it proceeds to step S507. In step S507, the microprocessor 130 can determine the voltage value of the received operating voltage VP for N times to determine whether the determination result of step S505 is misdetermination. N is an integer which is greater than or equal to 1. The aforementioned misdetermination may be because that the operating digital code value approximates the numeric value 4090 shown in Table 1 or the numeric value 350 in Table 1, i.e. approximating the boundary of the whole preset interval. After N times of determination, if the microprocessor 130 determines in step S508 that the voltage value of the operating voltage VP is invalid at least once, then it returns to step S504 to receive the next operating voltage VP. Otherwise, after N times of determination, if the microprocessor 130 determines in step S508 that the voltage value of the operating voltage VP is valid, then it proceeds to step S506.

In step S506, the microprocessor 130 can determine whether an interrupt command coming from the transmission interface 140 is received or not. If the microprocessor 130 does not receive the interrupt command, it indicates that the transmission interface 140 does not receive a group selection signal GS coming from the outside. The microprocessor 130 does not receive a new group selection signal GS either. Therefore, the microprocessor 130 can generate the control signals CS1-CS4 corresponding to the input voltage VIN according to the received operating voltage VP in step S509, and does not change the current group. In another aspect, if the microprocessor 130 receives the interrupt command in step S506, it indicates that the transmission interface 140 has received a new group selection signal GS coming from the outside. The microprocessor 130 has received the new group selection signal GS as well. Therefore, it proceeds to step S510.

The microprocessor 130 can determine in step S510 whether the group indicated by the new group selection signal GS and the current group are the same. If the group indicated by the new group selection signal GS and the current group are different, the microprocessor 130 can determine in step S510 that the group needs to be changed. Therefore, the microprocessor 130 can change the current group into a new group in step S511. Then, the microprocessor 130 can generate the control signals CS1-CS4 corresponding to the input voltage VIN according to the operating voltage VP in step S512. That is, based on the operations in step S511 and step S512, the microprocessor 130 can generate the control signals CS1-CS4 corresponding to the input voltage VIN and the group selection signal GS according to the operating voltage VP and the group selection signal GS.

In another aspect, if the group indicated by the new group selection signal GS and the current group are the same, the microprocessor 130 can determine in step S510 that the group does not need to be changed. The microprocessor 130 does not change the group and generates the control signals CS1-CS4 corresponding to the input voltage VIN according to the operating voltage VP in step S513.

In some embodiments, the street lamp control device 10 is not equipped with the transmission interface 140. The microprocessor 130 can execute steps S501-S505 and S507-

Figure 6:
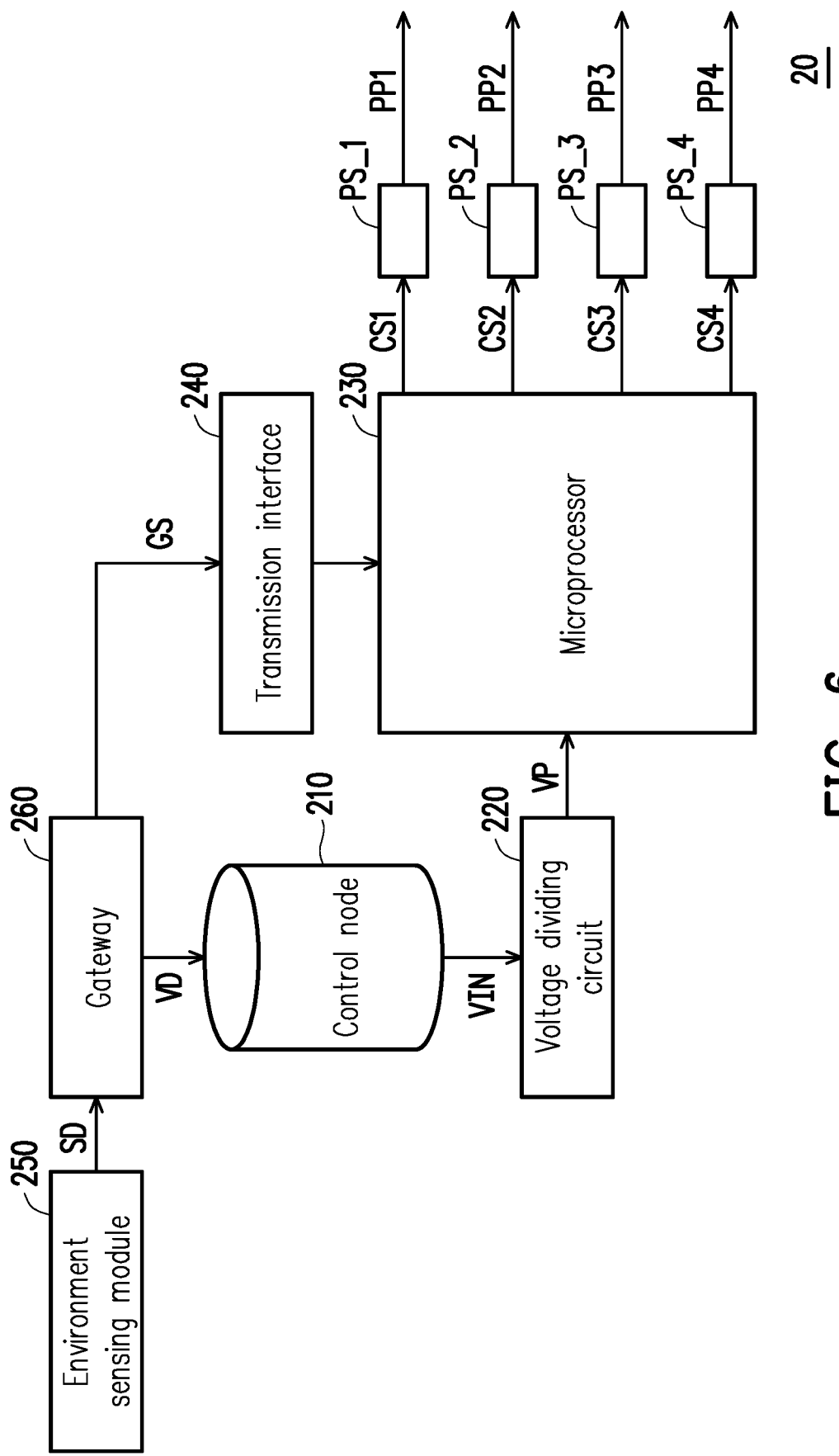
FIG. 6 is a schematic diagram of a street lamp control device according to another embodiment of the present invention.

S509. Refer to FIG. 6; FIG. 6 is a schematic diagram of a street lamp control device according to another embodiment of the present invention. In the present embodiment, a street lamp control device 20 includes a control node 210, a voltage dividing circuit 220, a microprocessor 230, a transmission interface 240, an environment sensing module 250, a gateway 260, and power supply units PS_1-PS_4. For the implementation details of the control node 210, the voltage dividing circuit 220, the microprocessor 230, the transmission interface 240 and the power supply units PS_1-PS_4, enough teaching can be obtained from multiple embodiments in FIGS. 1-5, and therefore is not repeated herein. In the present embodiment, the environment sensing module 250 senses the current environment around the street lamp to provide an environment category SD corresponding to the current environment. The environment sensing module 250 can at least include a monitor for sensing weather condition, vehicle flow and pedestrian flow; at least one brightness sensor for detecting brightness around the street lamp; and a temperature sensor. The environment sensing module 250 can perform analysis according to a sensing result for the current environment around the street lamp to generate an environment category SD corresponding to the current environment, and provide the environment category SD for the gateway 260.

In the present embodiment, the gateway 260 is coupled to the environment sensing module 250. The gateway 260 can receive the environment category SD and provide a group selection signal GS and input voltage information VD according to the environment category SD. The input voltage information VD is used to instruct the control node 210 to provide an input voltage VIN. In the present embodiment, the gateway 260 can be arranged in the body of the street lamp. In some embodiments, the gateway 260 can be arranged in the control node 210. In some embodiments, the gateway 260 can be arranged outside the body of the street lamp, for example, in an external electric control box.

For example, the environment sensing module 250 senses the current environment around the street lamp, and determines that the current environment is a foggy environment. Therefore, the environment sensing module 250 can provide an environment category SD corresponding to the foggy environment. The gateway 260 can provide a group selection signal GS and input voltage information VD corresponding to the foggy environment according to the environment category SD. Therefore, the street lamp can be controlled to provide light with higher brightness so as to increase visibility. For another example, the environment sensing module 250 senses the current environment around the street lamp, and determines that the current environment is an environment with a large vehicle flow. The environment sensing module 250 can provide an environment category SD corresponding to the environment with a large vehicle flow. The gateway 260 can provide a group selection signal GS and input voltage information VD corresponding to the environment with a large vehicle flow according to the environment category SD. Therefore, the street lamp can be controlled to provide a light shape of light with higher brightness for lanes. For another example, the environment sensing module 250 senses the current environment around the street lamp, and determines that the current environment is a low-temperature environment. The environment sensing module 250 can provide an environment category SD corresponding to the low-temperature environment. The gateway 260 can provide a group selection signal GS and input voltage information VD corresponding to the low-temperature environment according to the environment category SD. Therefore, the street lamp can be controlled to provide light with lower color temperature so as to enhance the use experience of pedestrians.

In some embodiments, under the condition that the street lamp control device 20 does not include the transmission interface 240, the gateway 260 can provide input voltage information VD according to the environment category SD, but does not provide a group selection signal GS. The gateway of the present invention can be set to provide at least one of the group selection signal GS and the input voltage information VD according to contents actually carried by the street lamp control device, and is not limited by the present embodiment.

In some embodiments, the street lamp control device 20 can also be designed to control a plurality of street lamps in the same field. That is, the street lamp control device 20 not only can control a specific single street lamp, but also can control at least one of other street lamps arranged in the same field as the street lamp. For example, each of a plurality of street lamps in a field can be respectively configured with the control node 210, the voltage dividing circuit 220, the microprocessor 230, the transmission interface 240 and the power supply units PS_1-PS_4 of the street lamp control device 20. A single environment sensing module 250 and a single gateway 260 can be configured in a field. Under such configuration, the environment sensing module 250 can sense the current environment of the field to provide an environment category SD corresponding to the current environment of the field. The gateway 260 receives the environment category SD, and provides a group selection signal GS and input voltage information VD corresponding to the current environment of the field to all the control nodes 210 and the transmission interfaces 240 in the field according to the environment category SD. Thus, the street lamp control device 20 can control the plurality of street lamps as a group in the field according to the current environment of the field.

Based on the above, according to the street lamp control device and the street lamp control method of the present invention, an input voltage is received via the control node; an operating voltage is generated according to the input voltage; a plurality of control signals are generated according to the voltage value of the operating voltage; and a plurality of light-emitting element groups of the street lamp are driven according to the plurality of control signals. Light shapes and color temperatures generated by the plurality of light-emitting element groups are not completely the same. As the plurality of control signals can be respectively used to drive the plurality of light-emitting element groups of the street lamp, the street lamp control device and the street lamp control method of the present invention can adjust at least one of the brightness, the light shape and the color temperature of the light of the street lamp. In addition, the street lamp control device and the street lamp control method of the present invention can also control a plurality of street lamps in the same field. Thus, the street lamp control device and the street lamp control method of the present invention can adjust at least one of the brightness, the light shape and the color temperature of the light of the plurality of street lamps according to the current environment of the field.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A street lamp control device, configured to control a street lamp, wherein the street lamp control device comprises:
a control node, configured to provide an input voltage;
a microprocessor, coupled to the control node, and configured to receive an operating voltage associated with the input voltage and receive a group selection signal, adjust a plurality of voltage values of a plurality of control signals corresponding to the input voltage according to the voltage value of the operating voltage, and select at least two of the control signals as at least two selected control signals according to the group selection signal;
a first power supply unit, coupled to the microprocessor and configured to generate a first operating power according to a first selected control signal; and
a second power supply unit, coupled to the microprocessor and configured to generate a second operating power according to a second selected control signal,
wherein a value of the second operating power is different from a value of the first operating power,
wherein the first operating power and the second operating power are respectively used to drive a first light-emitting element group and a second light-emitting element group of the street lamp, thereby adjusting a light shape of light of the street lamp,
wherein brightness of all of light-emitting elements of the first light-emitting element group are the same, and brightness of all of light-emitting elements of the second light-emitting element group are the same,
wherein light shapes generated by the first light-emitting element group and the second light-emitting element group are different from each other, and
wherein light shapes generated continuously by the first light-emitting element group and the second light-emitting element group partially overlap each other.

2. The street lamp control device according to claim 1, wherein the microprocessor is further configured to convert the operating voltage to generate an operating digital code value and determine whether the voltage value of the operating voltage is valid or not according to a digital code value interval in which the operating digital code value falls.

3. The street lamp control device according to claim 2, wherein
when the street lamp control device is started, the microprocessor is further configured to receive an initial digital code value,
wherein the initial digital code value is an operating digital code value received before the street lamp control device is switched off, or an operating digital code value preset before the street lamp control device leaves the factory.

4. The street lamp control device according to claim 1, wherein when receiving the group selection signal, a transmission interface provides an interrupt command, so that the microprocessor generates the at least two selected control signals corresponding to the group selection signal according to the interrupt command.

5. The street lamp control device according to claim 1, further comprising:
a storage device, coupled to the microprocessor and configured to store a lookup table,
wherein the microprocessor is further configured to obtain the at least two selected control signals corresponding to the group selection signal and the input voltage based on the lookup table.

6. The street lamp control device according to claim 1, further comprising:
an environment sensing module, configured to sense a current environment around the street lamp to provide an environment category corresponding to the current environment.

7. The street lamp control device according to claim 6, further comprising:
a gateway, coupled to the environment sensing module, and configured to receive the environment category and provide at least one of the group selection signal and input voltage information for instructing the control node to provide the input voltage according to the environment category.

8. The street lamp control device according to claim 6, wherein the street lamp control device is further configured to control at least one of other street lamps arranged in the same field as the street lamp.

9. The street lamp control device according to claim 1, wherein:
the first operating power is used to drive the first light-emitting element group; and
the second operating power is used to drive the second light-emitting element group.

10. The street lamp control device according to claim 1, wherein the street lamp control device further comprises:
a transmission interface, coupled to the microprocessor and configured to receive the group selection signal.

11. A street lamp control method for controlling a street lamp, wherein the street lamp control method comprises:
receiving an input voltage via a control node, and performing voltage dividing operation on the input voltage to generate an operating voltage;
receiving an operating voltage associated with the input voltage and a group selection signal;
adjusting a plurality of voltage values of a plurality of control signals corresponding to the input voltage according to the voltage value of the operating voltage, and selecting at least two of the control signals as at least two selected control signals according to the group selection signal;
generating a first operating power according to a first selected control signal among the selected control signals, and generating a second operating power according to a second selected control signal among the selected control signals; and
driving a first light-emitting element group and a second light-emitting element group of the street lamp according to the first operating power and the second operating power, thereby adjusting a light shape of light of the street lamp,
wherein brightness of all of light-emitting elements of the first light-emitting element group are the same, and brightness of all of light-emitting elements of the second light-emitting element group are the same,
wherein a value of the second operating power is different from a value of the first operating power,
wherein light shapes generated by the first light-emitting element group and the second light-emitting element group are different from each other, and
wherein light shapes generated continuously by the first light-emitting element group and the second light-emitting element group partially overlap each other.

12. The street lamp control method according to claim 11, further comprising:
converting the operating voltage to generate an operating digital code value, and determining whether the voltage value of the operating voltage is valid or not according to a digital code value interval in which the operating digital code value falls.

13. The street lamp control method according to claim 12, further comprising:
when the street lamp is started, receiving an initial digital code value,
wherein the initial digital code value is an operating digital code value received before the street lamp is switched off, or an operating digital code value preset before the street lamp leaves the factory.

14. The street lamp control method according to claim 11, further comprising:
when the group selection signal is received, providing an interrupt command, and generating the at least two selected control signals corresponding to the group selection signal according to the interrupt command.

15. The street lamp control method according to claim 11, wherein the step of selecting the at least two of the control signals as the at least two selected control signals according to the group selection signal comprises:
providing a lookup table; and
obtaining the at least two selected control signals corresponding to the group selection signal and the input voltage based on the lookup table.

16. The street lamp control method according to claim 11, further comprising:
sensing a current environment around the street lamp to provide an environment category corresponding to the current environment.

17. The street lamp control method according to claim 16, wherein the step of receiving the input voltage comprises:
receiving the environment category; and
providing at least one of the group selection signal and input voltage information for instructing the control node to provide the input voltage according to the environment category.

18. The street lamp control method according to claim 17, wherein the street lamp control method is further used to control at least one of other street lamps arranged in the same field as the street lamp.

19. The street lamp control method according to claim 11, wherein:
the first operating power is used to drive the first light-emitting element group; and
the second operating power is used to drive the second light-emitting element group.

\* \* \* \* \*